United States Patent
Tabares et al.

(10) Patent No.: US 10,789,093 B2
(45) Date of Patent: Sep. 29, 2020

(54) EXTENSION OF MOBILE DEVICE SENSOR CAPABILITIES INTO AN APPLICATION

(71) Applicant: CITRIX SYSTEMS, INC., Fort Lauderdale, FL (US)

(72) Inventors: Modesto Tabares, Fort Lauderdale, FL (US); Juan Rivera, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 51 days.

(21) Appl. No.: 16/268,127

(22) Filed: Feb. 5, 2019

(65) Prior Publication Data

US 2020/0249981 A1 Aug. 6, 2020

(51) Int. Cl.
*G06F 15/16* (2006.01)
*G06F 9/46* (2006.01)
*H04L 29/08* (2006.01)
*H04L 29/06* (2006.01)

(52) U.S. Cl.
CPC .............. *G06F 9/468* (2013.01); *H04L 67/12* (2013.01); *H04L 67/42* (2013.01)

(58) Field of Classification Search
CPC .......... G06F 9/468; H04L 67/12; H04L 67/42
See application file for complete search history.

(56) References Cited

U.S. PATENT DOCUMENTS

| 9,176,744 B2 | 11/2015 | Lee |
| 9,538,345 B2 | 1/2017 | Sah et al. |
| 2009/0282008 A1* | 11/2009 | Harrington ........ G06Q 30/0601 |
| 2013/0117769 A1 | 5/2013 | Sharma et al. |
| 2014/0063344 A1* | 3/2014 | Dureau ................. G06F 9/5055 348/552 |
| 2014/0250515 A1* | 9/2014 | Jakobsson ............... G06F 21/32 726/7 |
| 2015/0058944 A1 | 2/2015 | Schachtel et al. |
| 2016/0234342 A1* | 8/2016 | Oonk ....................... H04L 67/12 |
| 2017/0094716 A1* | 3/2017 | Pogorelik ............... H04L 67/04 |
| 2019/0090080 A1* | 3/2019 | Rathineswaran ..... H04L 67/303 |
| 2020/0120479 A1* | 4/2020 | Ryden ................... H04W 64/00 |

* cited by examiner

*Primary Examiner* — Philip B Tran

(74) *Attorney, Agent, or Firm* — Allen, Dyer, Doppelt + Gilchrist, PA

(57) ABSTRACT

A computing system includes an enterprise server providing an application, a mobile computing device having sensor capabilities registered with the enterprise server, and a client computing device operated by a user to access the application. The user is to request a capability of the application. The enterprise server is configured to compare the requested capability of the application to the registered sensor capabilities of the mobile computing device. If the requested capability of the application can be performed by the mobile computing device, then the enterprise server is configured to provide a notification to the mobile computing device requesting permission for the mobile computing device to provide access to the sensor capability corresponding to the requested capability of the application. The mobile computing device performs the requested capability of the application after permission is granted.

20 Claims, 7 Drawing Sheets

EXTENSION OF MOBILE DEVICE SENSOR CAPABILITIES INTO AN APPLICATION

TECHNICAL FIELD

The present disclosure relates to applications, and more particularly, to extending mobile device sensor capabilities into an application.

BACKGROUND

Many computer desktop applications include graphical user interfaces (GUI) that have been developed for use on conventional personal computers, workstations, laptops, or other computing devices, that all typically have large displays. In contrast, mobile devices are often designed to be small enough to fit in a pocket and have relatively small displays. When it comes to supporting desktop or enterprise applications on mobile devices, limiting factors include the small display size and inadequate computational capacity.

Various methods have been developed to run some desktop applications on mobile devices, but the results typically range from cumbersome and clumsy to not feasible or cost-prohibitive. The most common examples include rewriting applications, in whole or in part, to accommodate mobile device limitations, providing limited versions of applications, and scaling the application's graphics to fit on the mobile device display.

SUMMARY

A system includes an enterprise server providing an application, a mobile computing device having sensor capabilities registered with the enterprise server, and a client computing device operated by a user to access the application. The user is to request a capability of the application. The enterprise server is configured to compare the requested capability of the application to the registered sensor capabilities of the mobile computing device. If the requested capability of the application can be performed by the mobile computing device, then the enterprise server is configured to provide a notification to the mobile computing device requesting permission for the mobile computing device to provide access to the sensor capability corresponding to the requested capability of the application. The mobile computing device performs the requested capability of the application after permission is granted.

The mobile computing device may be paired with the client computing device. The enterprise server may be in communication with the mobile computing device and the client computing device using a cloud service. The sensor capabilities of the mobile computing device may include at least one of a camera, microphone, fingerprint sensor, and global positioning system (GPS).

In addition, the enterprise server is configured to receive input generated from the mobile computing device on the sensor capabilities, and process the input to transmit to the application. A mobile application may also be provided by the enterprise server to the mobile computing device in order to access the registered sensor capabilities of the mobile computing device. The enterprise server stores the registered sensor capabilities of the mobile computing device.

Another aspect is directed to a method for extending sensor capabilities of a mobile computing device into an application provided by an enterprise server and being accessed by a client computing device. The enterprise server is in communication with the mobile computing device and the client computing device using a cloud service. The method includes registering the sensor capabilities of the mobile computing device, receiving a request from the client computing device to access the application, and receiving a request from the client computing device for a capability of the application. The method includes comparing the requested capability of the application to the registered sensor capabilities of the mobile computing device. The method also includes providing a notification to the mobile computing device requesting permission for the mobile computing device to provide access to the sensor capability corresponding to the requested capability of the application. The sensor capability of the mobile computing device is extended into the application when the requested capability of the application can be performed by the mobile computing device and permission is granted.

Yet another aspect is directed to non-transitory computer readable medium for extending sensor capabilities of a mobile computing device into an application provided by an enterprise server and being accessed by a client computing device, and with the non-transitory computer readable medium having a plurality of computer executable instructions for causing the enterprise server to perform steps as described above.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, solid-state storage devices, and/or any combination thereof.

Figure 1:
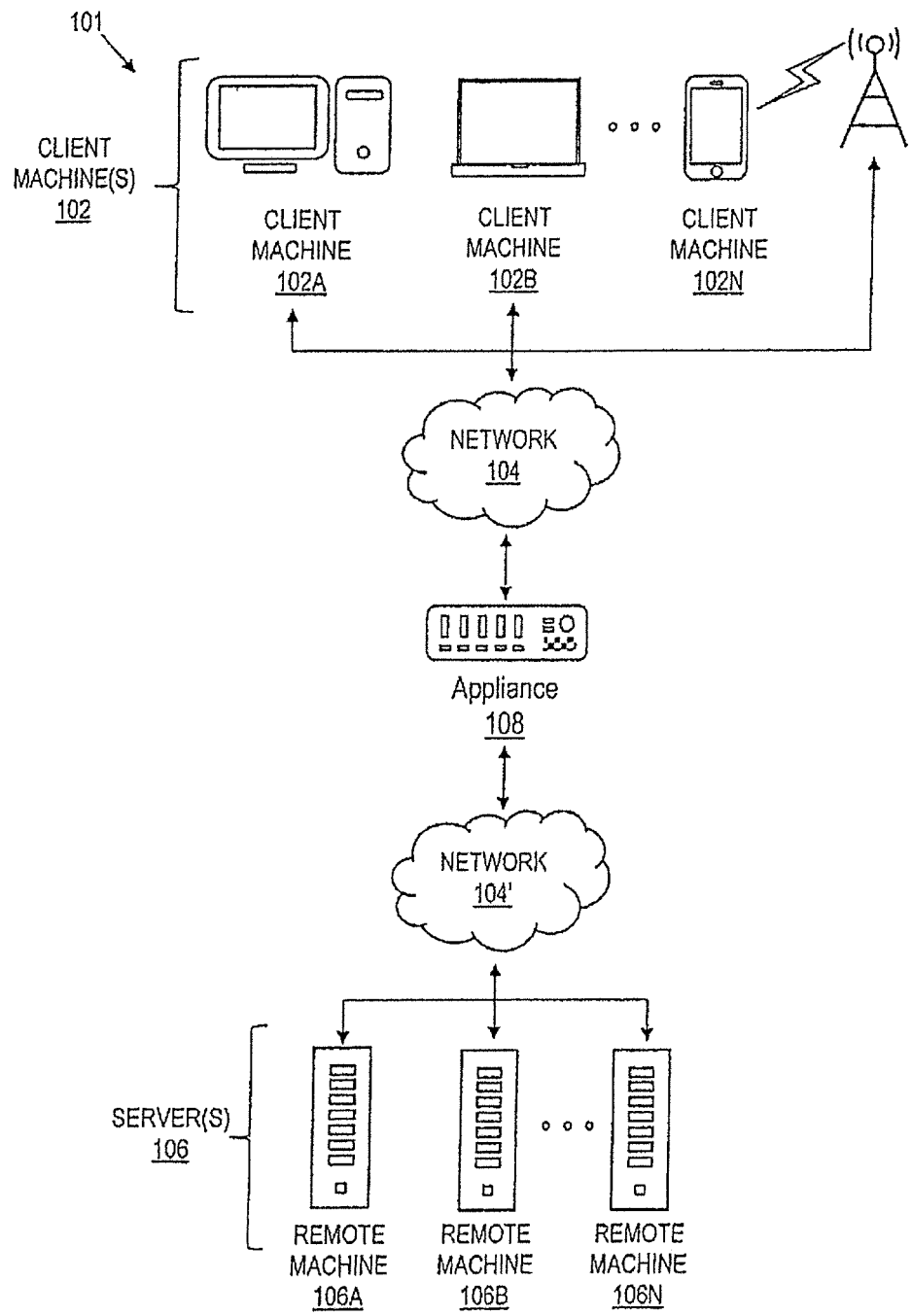
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer or Transport Layer Security (TLS) Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
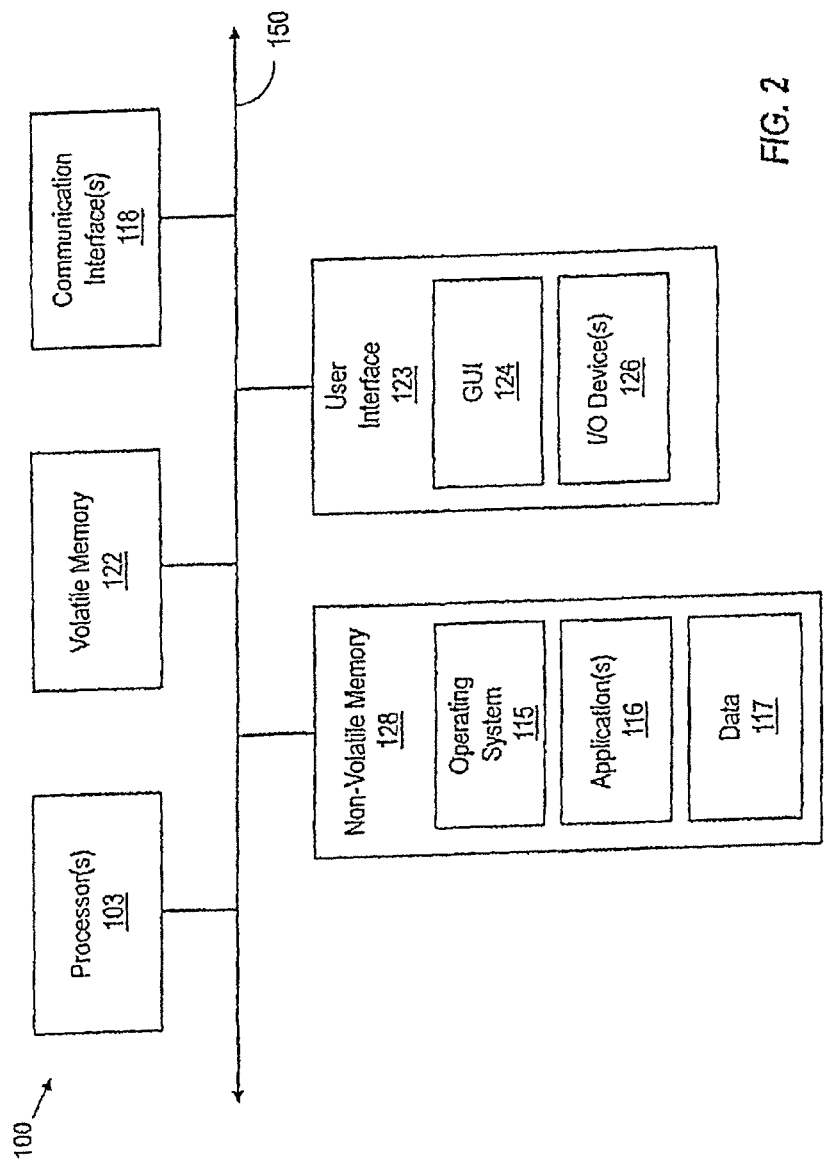
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
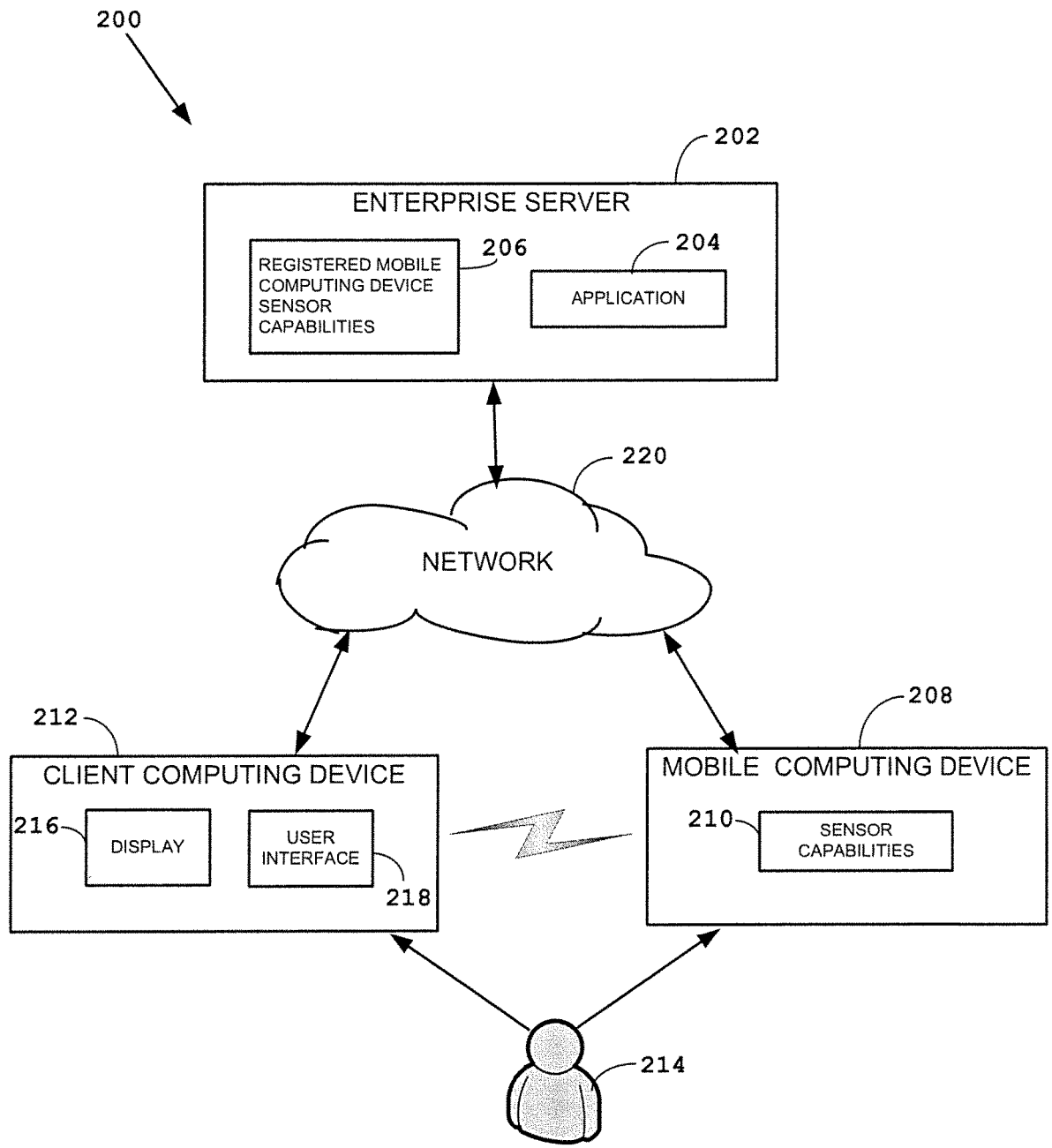
FIG. 3 is a block diagram of a system for extending sensor capabilities of a mobile computing device into an application being accessed by a client computing device in which various aspects of the disclosure may be implemented.

Turning now to FIG. 3, the illustrated components may be used to implement various systems and methods as will now be described. Typical mobile applications focus on attempting to replicate the full size experience on the mobile computing device. This often fails because the application is designed for a full size experience. The present approach extends sensor capabilities of a mobile computing device into an application and is directed to moving away from replicating the full size application on a mobile device. The system does not attempt to replicate the full size experience on the mobile computing device, but instead improves the integration of the mobile computing device as a utility extension to the application. This is achieved by extending sensor capabilities of the mobile computing device to be leveraged by the application. As such, the systems and methods set forth herein advantageously provide improved performance within a virtualized and/or enterprise computing environment.

A block diagram 200 of a system 200 in which various aspects of the disclosure may be implemented is illustrated. In particular, the system 200 includes an enterprise server 202 providing an application 204 to a client computing device 212 in communication with a mobile computing device 208. The mobile computing device 208 includes sensor capabilities 210, and the sensor capabilities are registered 206 with the enterprise server 202. The registrations may be stored on the enterprise server 202. The system 200 is configured to extend the sensor capabilities 210 of the mobile computing device 208 into the application 204 where the sensor capabilities 210 may include a microphone, one or more speakers, one or more cameras, one or more biometric scanners, one or more environmental sensors, and one or more accelerometers, for example.

The client computing device 212 is operated by a user 214 using a user interface 218 coupled to a display 216, and the client computing device 212 is configured for the user 214 to request a capability of the application 204. The client computing device 212 may also be paired with the mobile computing device 208 operated by the user 214, and the enterprise server 202 may be in communication with the mobile computing device 208 and the client computing device 212 using a network 220 (e.g., a cloud service). A mobile application 204 may also be provided by the enterprise server 202 to the mobile computing device 208 in order to access the sensor capabilities 210 of the mobile computing device 208 that are registered 206.

In addition, the enterprise server 202 is configured to compare the requested capability of the application 204 to the registered sensor capabilities 206 of the mobile computing device 208. If the requested capability of the application 204 can be performed by the mobile computing device 208, then the enterprise server 202 provides a notification to the mobile computing device 208 requesting permission for the mobile computing device 208 to provide access to the sensor capability 210 corresponding to the requested capability of the application 204. After permission is granted, the mobile computing device 208 performs the requested capability of the application 204.

The enterprise server 202 receives input generated from the mobile computing device sensor capabilities 210, such as the camera, and processes the input to transmit to the application 204. The other sensor capabilities 210 (e.g., global positioning system (GPS), biometric authentication, touch screen, microphone, motion, etc.) of the mobile computing device 208 can also be similarly extended into the application 204.

As an example, the application 204 may need scanning functionality and the user 214 can access the camera of the mobile computing device 208. Accordingly, the scanning functionality can be delivered to the application 204 being accessed by the user 214 on the client computing device 212 by using the camera of the mobile computing device 208 associated with the enterprise server 202 (e.g., workspace). The mobile computing device 208 is also paired to the client computing device 212.

Figure 4A:
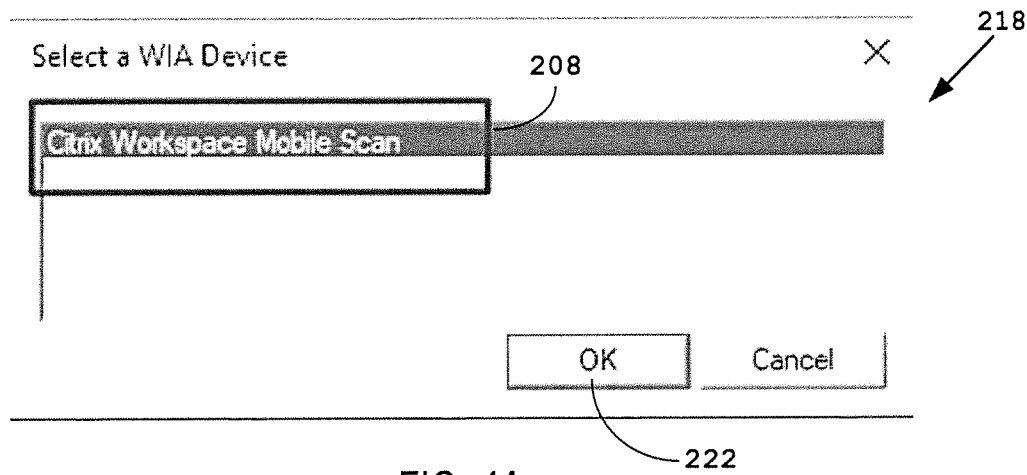
FIG. 4A is a screen shot of a user interface illustrating a user selecting the computing device of the system illustrated in FIG. 3 to perform a scanning function.
Figure 4B:
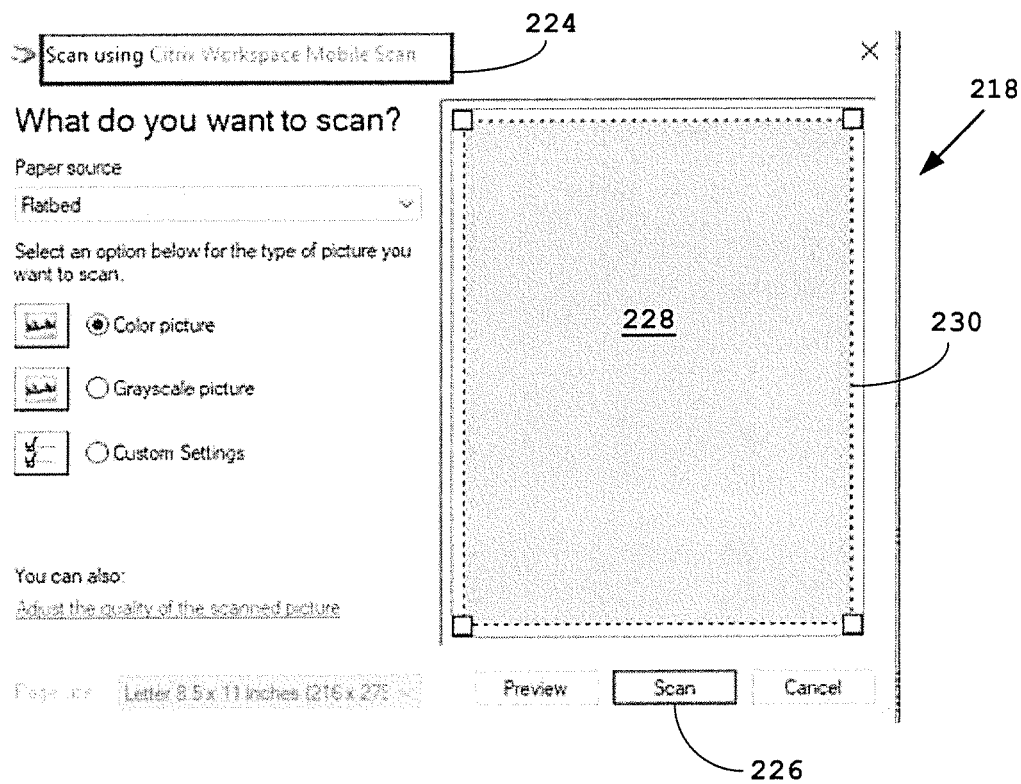
FIG. 4B is another screen shot of the user interface of the system illustrating a user opening a scanning dialog of the application.

Referring now to FIGS. 4A and 4B, the user 214 opens a scanning dialog 224 in the application 204 using the user interface 218 where a mobile computing device 208 having scanning capability is identified on the display 216 and selected 222 by the user 214. The user 214 then starts the scanning workflow 226 which triggers the mobile computing device 208 to receive a notification from the enterprise server 202 that may state, for example, "App XYZ from your Workspace wants to use your Phone as a scanner. Allow/Deny?". If the user 214 allows, a camera application opens on the mobile computing device 208 allowing the user 214 to take a photograph 228 of what they wish to scan (e.g., a document). Once the photograph 228 is taken, the photograph 228 is processed to identify boundaries 230 of the photograph 228 and process further as needed. The processing may occur on the mobile computing device 208 and/or the enterprise server 202. The processed photograph 228 is then delivered to the application 204. From a perspective of the user 214, the user 214 initiated a scan in a typical way but conveniently using a sensor (i.e., camera) of the mobile computing device 208 as a scanning device.

Figure 5:
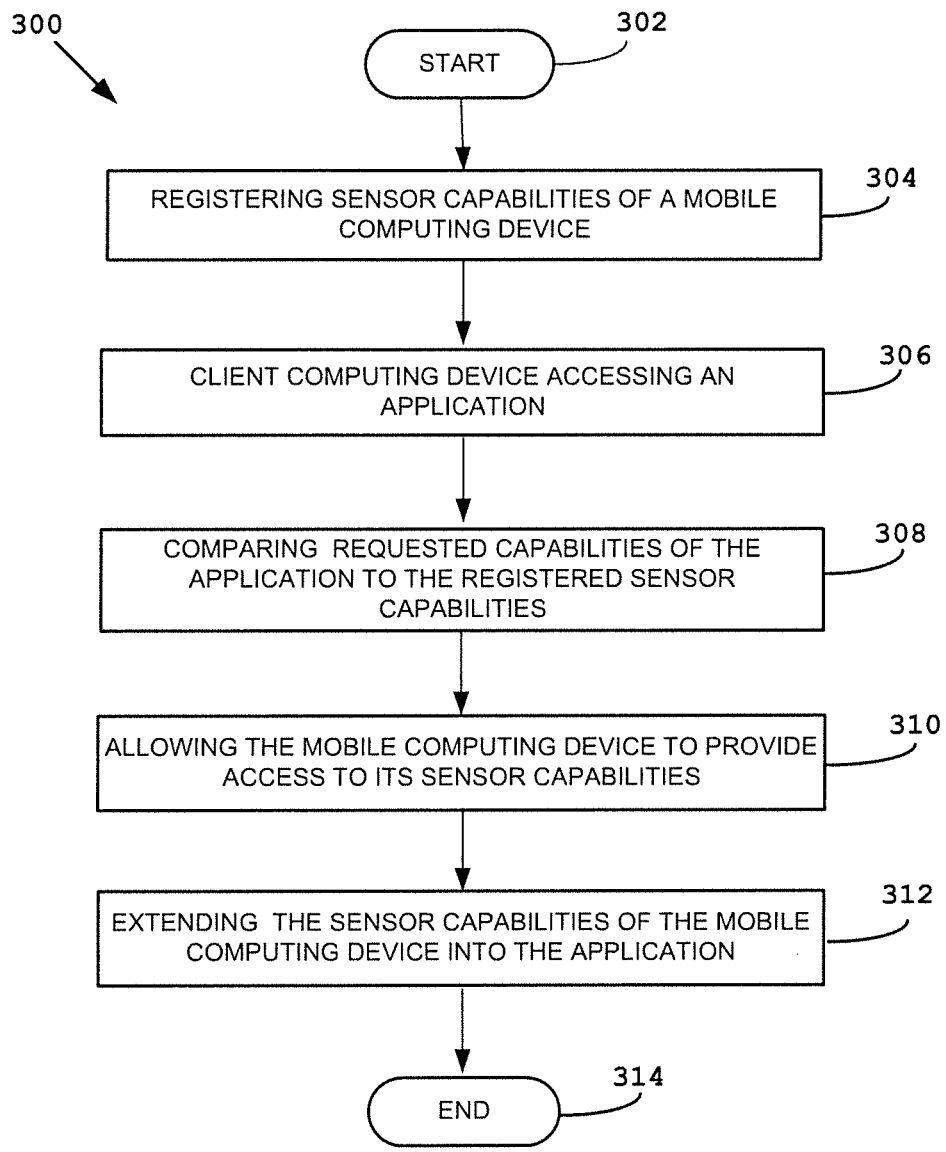
FIG. 5 is a general flowchart illustrating a method for operating the system illustrated in FIG. 3.

Referring now to the flowchart 300 in FIG. 5, and generally speaking, a method for operating the system illustrated in FIG. 3 will be discussed. From the start (Block 302), the method includes registering sensor capabilities 210 of a mobile computing device 208, at Block 304, and, at Block 306, a client computing device 212 accessing an application 204. Moving to Block 308, the method includes comparing requested capabilities of the application to the registered sensor capabilities, and allowing the mobile computing device 208 to provide access to its sensor capabilities 210, at Block 310. The method also includes, at Block 312, extending the sensor capabilities 210 of the mobile computing device 208 into the application. The method ends at Block 314.

Figure 6:
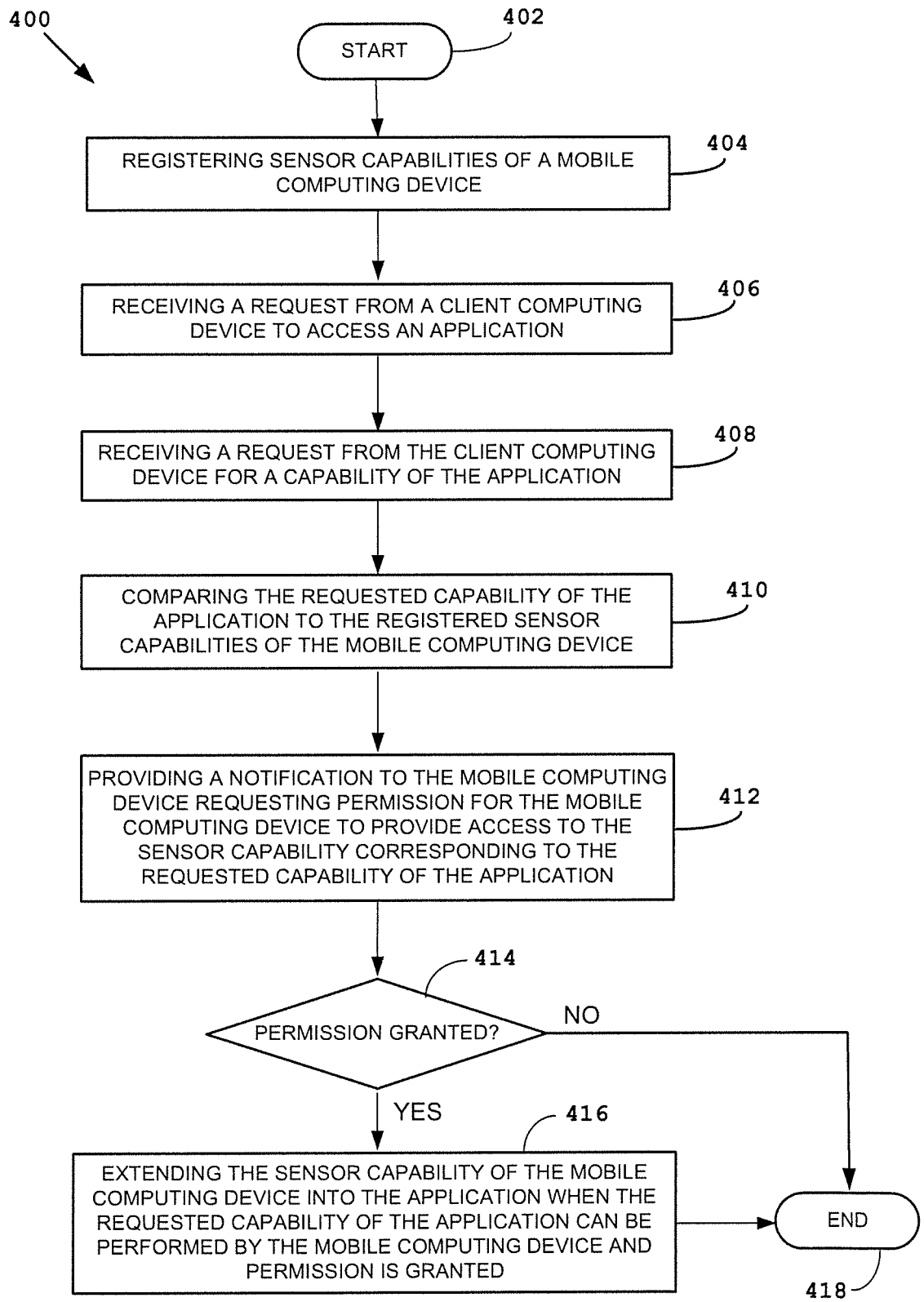
FIG. 6 is a more detailed flowchart illustrating a method for operating the enterprise server illustrated in FIG. 3.

FIG. 6 depicts a more detailed flowchart 400 illustrating the method for operating the enterprise server 202 illustrated in FIG. 3. In particular, the method for extending the sensor capabilities 210 of the mobile computing device 208 into the application 204 provided by the enterprise server 202 and being accessed by a client computing device 212 begins, at Block 402. The sensor capabilities of a mobile computing device 208 are registered with the enterprise server 202, at Block 404, and a request from the client computing device 212 to access the application 204 is received at Block 406.

After the client computing device 212 has accessed the application 204, a request is received, at Block 408 from the client computing device 212 for a capability of the application 204 such as a scanning function, for example. The requested capability of the application 204 is compared, at Block 410, to the registered sensor capabilities 206 of the mobile computing device 208. A notification is provided to the mobile computing device 208 requesting permission, at Block 412, for the mobile computing device 208 to provide access to the sensor capability 210 corresponding to the requested capability of the application 204.

If permission is not granted, at Block 414, then the method ends at Block 418. If permission is granted, at Block 414, then the sensor capability 210 is extended into the application 204 when the requested capability of the application 204 can be performed by the mobile computing device 208. The method ends at Block 418.

Figure 7:
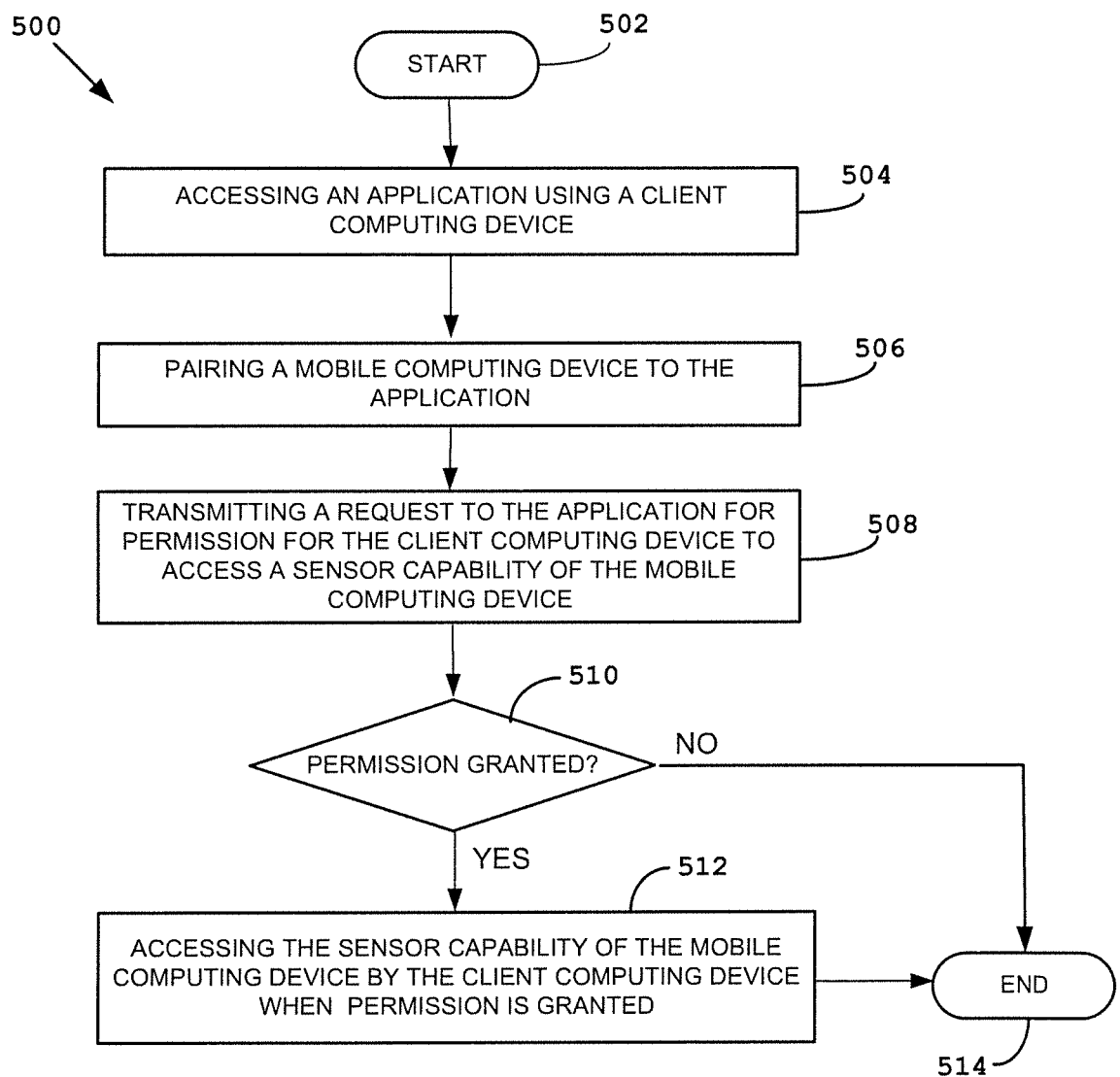
FIG. 7 is a more detailed flowchart illustrating a method for operating the client computing device illustrated in FIG. 3.

FIG. 7 depicts a more detailed flowchart 500 illustrating the method for operating the client computing device 212 illustrated in FIG. 3. In particular, the method begins, at Block 502, and includes accessing an application 204 using the client computing device 212, at Block 504. The mobile computing device 208 is paired to the application 204, at Block 506, and a request is transmitted, at Block 508, to the application 204 for permission for the client computing device 212 to access a sensor capability 210 of the mobile computing device 208. If permission is not granted, at Block 510, then the method ends at Block 514. If permission is granted, at Block 510, the sensor capability 210 of the mobile computing device 208 is accessed by the client computing device 212 when permission is granted. The method ends at Block 514.

Another aspect is directed to a non-transitory computer readable medium for extending the sensor capabilities 210 of the mobile computing device 208 into the application 204. As described above, the application 204 is provided by the enterprise server 202 to the client computing device 212. The non-transitory computer readable medium has a plurality of computer executable instructions for causing the enterprise server 202 to perform steps. The computer executable instructions include registering the sensor capabilities 206 of the mobile computing device 208 with the enterprise server 202, receiving a request from the client computing device 212 to access the application 204, and receiving a request from the client computing device 212 for a capability of the application 204.

In addition, the computer executable instructions include comparing the requested capability of the application 204 to the registered sensor capabilities 206 of the mobile computing device 208, providing a notification to the mobile computing device 208 requesting permission for the mobile computing device 208 to provide access to the sensor capability 210 corresponding to the requested capability of the application 204. The computer executable instructions also include extending the sensor capability 210 of the mobile computing device 208 into the application 204 when the requested capability of the application 204 can be performed by the mobile computing device 208 and permission is granted.

Generally speaking, the present approach extends sensor capabilities of a mobile computing device into an application and is directed to moving away from replicating the full size application on a mobile device. The system does not attempt to replicate the full size experience on the mobile computing device, but instead improves the integration of the mobile computing device as a utility extension to the application. This is achieved by extending sensor capabilities of the mobile computing device to be leveraged by the application. As such, the systems and methods set forth herein advantageously provide improved performance within a virtualized and/or enterprise computing environment.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed:

1. A computing system comprising:
    an enterprise server providing an application;
    a mobile computing device having sensor capabilities, with the sensor capabilities being registered with said enterprise server;
    a client computing device operated by a user to access the application, with the user requesting a capability of the application;
    said enterprise server comparing the requested capability of the application to the registered sensor capabilities of said mobile computing device, and if the requested capability of the application can be performed by said mobile computing device, then providing a notification to said mobile computing device requesting permission for said mobile computing device to provide access to the sensor capability corresponding to the requested capability of the application; and said mobile computing device performing the requested capability of the application after permission is granted.

2. The computing system according to claim 1 wherein the mobile computing device is paired with said client computing device.

3. The computing system according to claim 1 wherein said enterprise server is in communication with the mobile computing device and the client computing device using a cloud service.

4. The computing system according to claim 1 wherein the sensor capabilities comprise at least one of a camera, microphone, fingerprint sensor, and global positioning system (GPS).

5. The computing system according to claim 1 wherein the enterprise server receives input generated from the mobile computing device on the sensor capabilities, and processes the input to transmit to the application.

6. The computing system according to claim 1 wherein a mobile application is provided by the enterprise server to the mobile computing device in order to access the registered sensor capabilities of said mobile computing device.

7. The computing system according to claim 1 wherein said enterprise server stores the registered sensor capabilities of said mobile computing device.

8. A method for extending sensor capabilities of a mobile computing device into an application provided by an enterprise server and being accessed by a client computing device, the method comprising:
  registering the sensor capabilities of the mobile computing device;
  receiving a request from the client computing device to access the application;
  receiving a request from the client computing device for a capability of the application;
  comparing the requested capability of the application to the registered sensor capabilities of the mobile computing device;
  providing a notification to the mobile computing device requesting permission for the mobile computing device to provide access to the sensor capability corresponding to the requested capability of the application; and
  extending the sensor capability of the mobile computing device into the application when the requested capability of the application can be performed by the mobile computing device and permission is granted.

9. The method according to claim 8 wherein the mobile computing device is paired with the client computing device.

10. The method according to claim 8 wherein the sensor capabilities comprise at least one of a camera, microphone, fingerprint sensor, and global positioning system (GPS).

11. The method according to claim 8 wherein the enterprise server receives input generated from the mobile computing device on the sensor capabilities, and processes the input to transmit to the application.

12. The method according to claim 8 further comprising providing a mobile application to the mobile computing device in order to access the registered sensor capabilities of the mobile computing device.

13. The method according to claim 8 further comprising storing the registered sensor capabilities of the mobile computing device.

14. A non-transitory computer readable medium for extending sensor capabilities of a mobile computing device into an application provided by an enterprise server and being accessed by a client computing device, and with the non-transitory computer readable medium having a plurality of computer executable instructions for causing the enterprise server to perform steps comprising:
  registering the sensor capabilities of the mobile computing device;
  receiving a request from the client computing device to access the application;
  receiving a request from the client computing device for a capability of the application;
  comparing the requested capability of the application to the registered sensor capabilities of the mobile computing device;
  providing a notification to the mobile computing device requesting permission for the mobile computing device to provide access to the sensor capability corresponding to the requested capability of the application; and
  extending the sensor capability of the mobile computing device into the application when the requested capability of the application can be performed by the mobile computing device and permission is granted.

15. The non-transitory computer readable medium according to claim 14 wherein the mobile computing device is paired with the client computing device.

16. The non-transitory computer readable medium according to claim 14 wherein the sensor capabilities comprise at least one of a camera, microphone, fingerprint sensor, and global positioning system (GPS).

17. The non-transitory computer readable medium according to claim 14 wherein the enterprise server is in communication with the mobile computing device and the client computing device using a cloud service.

18. The non-transitory computer readable medium according to claim 14 wherein the enterprise server is configured to receive input generated from the mobile computing device on the sensor capabilities, and processes the input to transmit to the application.

19. The non-transitory computer readable medium according to claim 14 further comprising computer executable instructions for causing the enterprise server to provide a mobile application to the mobile computing device in order to access the registered sensor capabilities of the mobile computing device.

20. The non-transitory computer readable medium according to claim 14 further comprising computer executable instructions for causing the enterprise server to store the registered sensor capabilities of the mobile computing device.

* * * * *